CAPTURE EFFECT GLIDE SLOPE SYSTEM

Filed Nov. 13, 1965 5 Sheets-Sheet 1

INVENTOR

HENRY H. BUTTS

BY Joseph A. Hill

ATTORNEY

PRIMARY MODULATED CARRIER AND ITS SIDEBANDS (E1)

SIDEBAND ONLY (E2)

INVENTOR
HENRY H. BUTTS
BY Joseph A. Hite
ATTORNEY

June 13, 1967 H. H. BUTTS 3,325,812

CAPTURE EFFECT GLIDE SLOPE SYSTEM

Filed Nov. 13, 1965 5 Sheets-Sheet 3

INVENTOR
HENRY H. BUTTS

BY Joseph A. Hill

ATTORNEY

INVENTOR
HENRY H. BUTTS
BY Joseph A. Hill
ATTORNEY

CAPTURE EFFECT GLIDE SLOPE SYSTEM

Filed Nov. 13, 1965 5 Sheets-Sheet 5

INVENTOR.
HENRY H. BUTTS
BY *William G. Gapcynski*
ATTORNEY 3,325,812
CAPTURE EFFECT GLIDE SLOPE SYSTEM
Henry H. Butts, Arlington, Va., assignor to the United States of America as represented by the Secretary of the Army
Filed May 13, 1965, Ser. No. 455,661
10 Claims. (Cl. 343—108)

ABSTRACT OF THE DISCLOSURE

This invention relates to a glide slope landing system transmitting a clearance signal at a different frequency than that of the primary carrier signal. By its use a well defined, highly stable and highly reliable glide slope path is achieved at landing sites which are surrounded by unfavorable terrain. By particular antenna arrangements, desired radiation patterns are achieved thus overcoming unfavorable terrain characteristics. The older glide slope landing systems were only effective at landing sites which were relatively flat for several miles in front of the antenna system. Any terrain irregularity such as a mountain or depression would cause considerable roughness or bends in the glide slope beam especially in low angle approach regions. Consequently a false landing course would register which at times proved dangerous to the aircraft relying upon the glide slope.

The invention described herein may be manufactured and used by or for the Government for governmental purposes without the payment to me of any royalty thereon.

One system, the M-array (see IRE Transactions on Aeronautical and Navigational Electronics, volume ANE–6, No. 12, June 1959, and Final Engineering Report, Contract FAA/BRD–164, by ITT Laboratories dated October 1960) was somewhat more effective at these landing sites with adverse terrain features. But the M-array at low approach angles proved to be too critical. The slightest variation in the feeding arrangement would cause false landing course readings. For example, should a cable feeding the M-array antennas deteriorate, the radiated pattern would no longer accurately represent the correct glide slope. Such inaccuracies would occur with only small amounts of attenuation from a slight deterioration of the feeding cables.

This invention overcomes these shortcomings by providing a low angle glide approach system of consistently high accuracy and stability which is readily adaptable to landing sites with adverse siting conditions. This end is accomplished by applying the principles of the capture effect, hereinafter defined. The invention will be more fully described with reference to the drawings in which:

FIG. 1 is a vertical lobe structure for one embodiment of the invention;

FIG. 1*a* shows the arrangement of antennas providing the lobe pattern of FIG. 1 wherein antenna 72 is 11.3 units above the ground, antennas 71 and 76 are 34.0 units above the ground, and antenna 70 is 47.6 units above the ground;

FIG. 1*b* shows the equipment necessary to achieve the improved lobe pattern of the first embodiment;

FIGS. 2*a*, 2*b* and 2*c* are phase diagrams which show the composition of the primary modulated carrier, the sideband and the clearance signals of a second embodiment;

FIG. 3 which relates to the second embodiment shows the arrangement of antennas providing the lobe pattern of FIG. 3*a*;

FIG. 3*a* shows the vertical lobe structure of the primary modulated carrier;

FIG. 3*b* shows the vertical lobe structure of the sideband energy;

FIG. 3*c* shows the arrangement of antennas providing the lobe pattern of FIG. 3*b*;

FIG. 3*d* shows the clearance signal's vertical lobe structure;

FIG. 3*e* shows the arrangement of antennas providing the lobe pattern of FIG. 3*d*;

Figure 1:
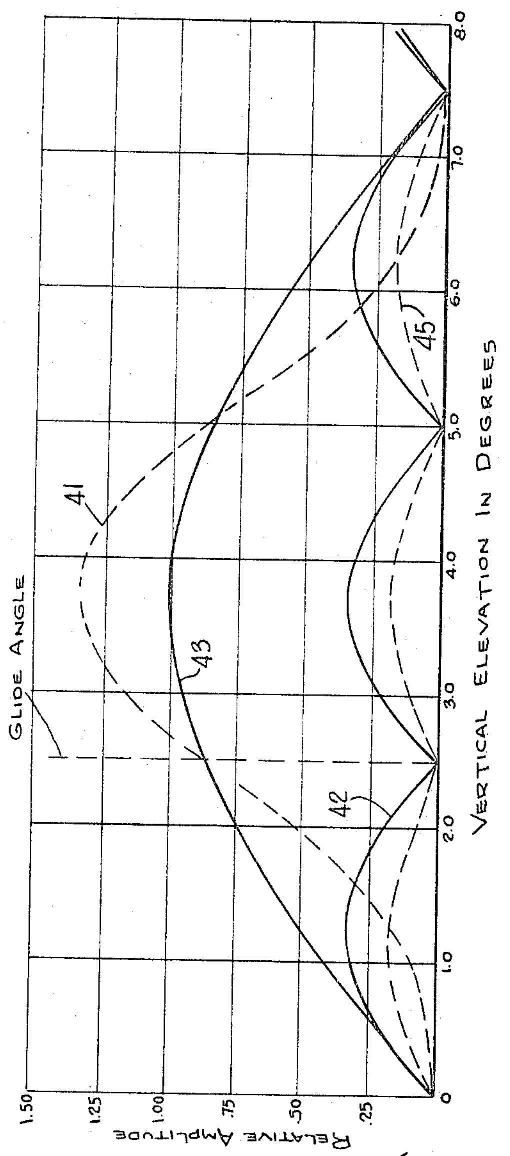
Figure 1A:
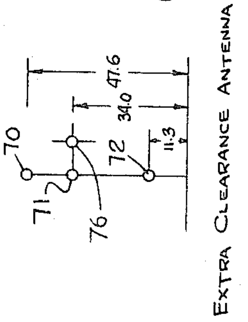
Figure 1B:
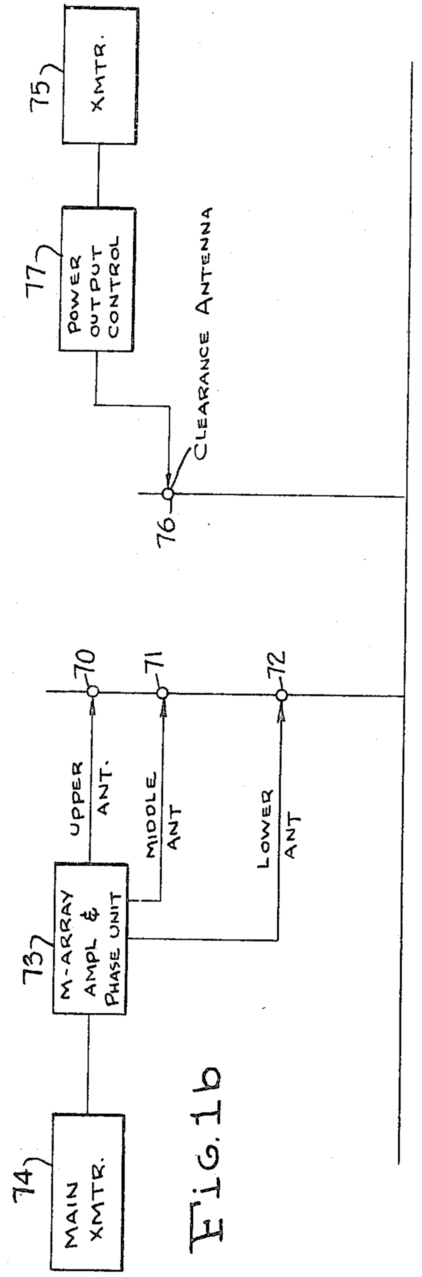
Figure 6A:
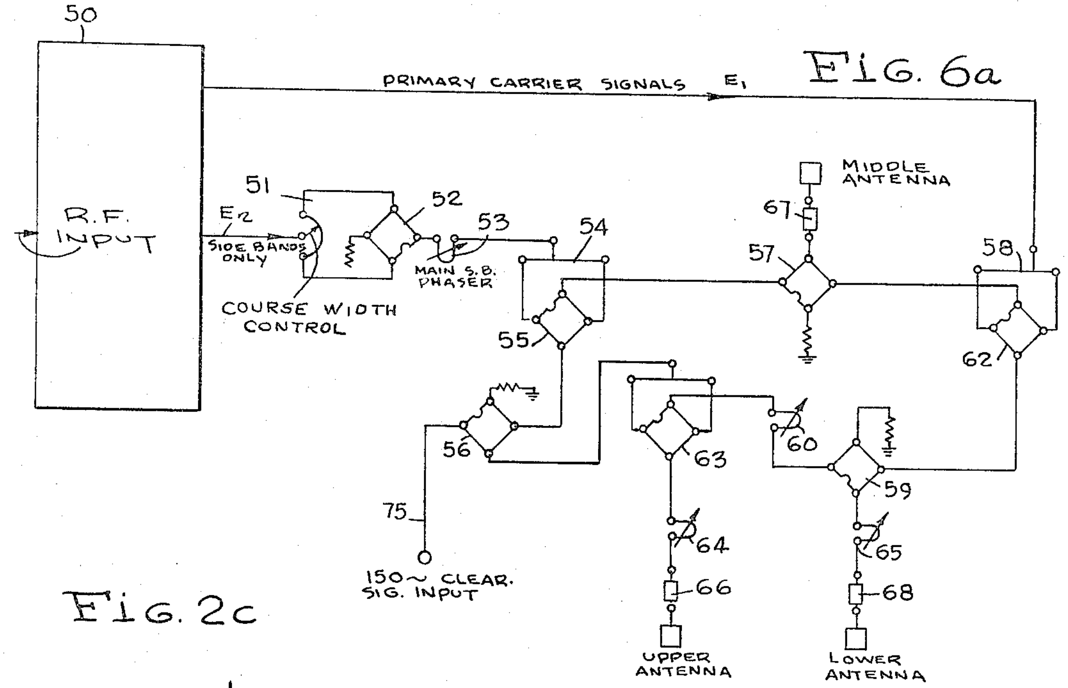
FIG. 6*a* shows the circuitry and feeding arrangement for the second embodiment of the invention.
Figure 6B:
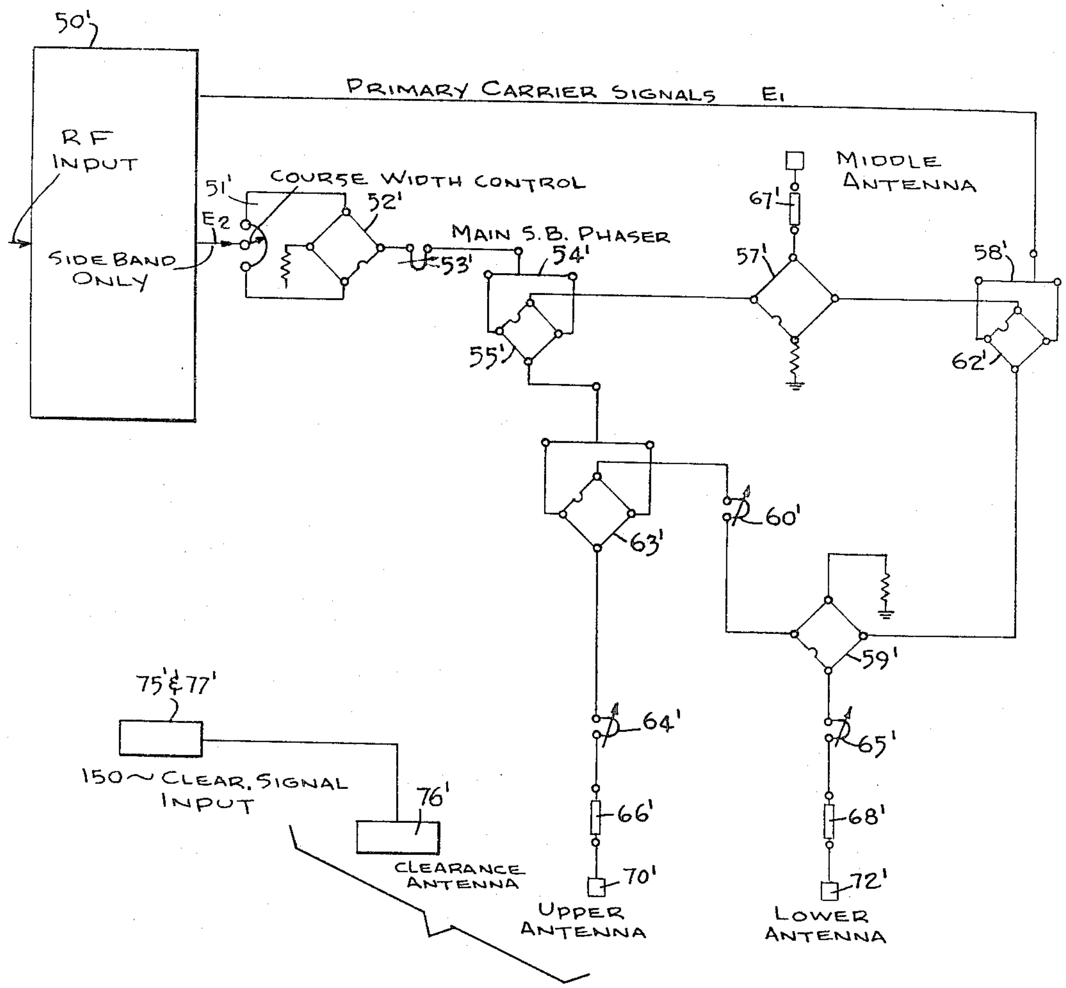

FIG. 6*b* shows the circuitry and feeding arrangement for the first embodiment of the invention as represented in FIG. 1*b*.

The term, capture effect, is the manner in which a linear receiver detector circuit responds to two different radio frequency signals which are within the pass band of the receiver. If one signal is stronger than the other the receiver will discriminate against the weaker signal, resulting in a much greater ratio of the detected (stronger/weaker) signals than the ratio of the signals at the input of the receiver. A conventional glide slope receiver is anticipated to be used in conjunction with the transmitting apparatus. The pass band of the receiver is to be of such a value so as to receive both the primary carrier signals and the clearance signal.

To produce the capture effect, two carrier signals, an auxiliary carrier signal (referred to as the clearance signal) offset between 5 and 20 kilocycles from a primary carrier signal, and the primary carrier, are fed into a series of antennas.

The first embodiment of this invention overcomes the critical nature of the M-array by providing a fourth antenna 76, FIG. 1*b*, hereinafter referred to as the extra clearance antenna. The M-array is produced by the feeding arrangement described in the IRE publication previously cited. Essentially the arrangement consists of 3 antennas, a lower, middle and upper whose heights are 1, 3.01 and 4.21 units, respectively. Carrier energy is fed into the lower and middle antennas. The carrier energy fed to the middle antenna is ⅓ of and 180° out of phase with the carrier energy fed to the lower antenna. Sideband energy is fed to all three antennas.

The sideband energy fed to the lower antenna is 0.192 of the carrier energy fed to the lower antenna and 180° out of phase with the sideband energy fed to the middle antenna. The sideband energy fed to the middle antenna is 0.315 of the carrier energy fed to the lower antenna. The sideband energy fed to the upper antenna is 0.182 of the carrier energy fed to the lower antenna and out of phase with the sideband energy fed to the middle antenna.

FIG. 1, curve 41, which is composed of the two integral curves 42 and 43, represents the composite carrier lobe structure for the M-array. Note that for low angles the normal M-array composite carrier curve 41, is very low compared to the field strength of the on-path glide angle position which occurs at 2.5°. This is not a desirable characteristic for safe landing conditions. In addition minor amounts of cable deterioration will create inaccuracies in the pattern representing the correct glide slope. Consequently a false course will register in the airborne receiver. It has been found that a much higher degree of stability is achieved by the addition of an extra clearance signal as shown in FIG. 1*b*. This signal offset about 20 kilocycles from the main carrier frequency used in the M-array and modulated by 150 c.p.s. is fed into the extra clearance antenna 76.

For optimum operating condition this clearance antenna, 76, should be equal in height to the middle M-array antenna 71. FIG. 1, curve 45 represents the effect of the added clearance signal. The signal of the lobe structure for the "M-array" 41 at low angles is fairly weak. The addition of the clearance signal 45 overcomes this difficulty. Yet the glide angle is not altered in any way. Also, tests disclose that the stability of the overall arrangement is greatly improved.

The equipment necessary to carry out this invention consists of that equipment required for the M-array with the addition of an extra clearance antenna and a power source for the clearance signal. FIG. 1*b* shows the auxiliary transmitter 75 serially connected to a power output control unit 77. The equipment necessary to produce the M-array consists of the three antennas 70, 71 and 72. The amplitude and phase unit 73 connects the transmitter 74 to the antennas 70, 71 and 72.

The extra clearance antenna 76 can be eliminated by the arrangement described in the second embodiment. This arrangement defines a method of feeding three antennas with a primary signal and an auxiliary signal. Unlike the first embodiment, this second embodiment does not depend upon the M-array. It is a completely unique arrangement which obviates the necessity of an extra clearance antenna to achieve fairly identical results as the first embodiment. Tests indicate that the second embodiment is much more stable than the first. Also, its lobe structure more accurately represents the precise glide path.

Figure 2A:
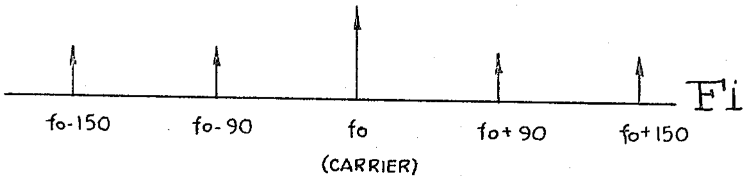
Figure 2B:
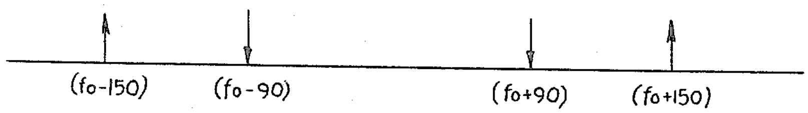

In this embodiment the primary signal consists of two parts, a primary modulated carrier and its sidebands ($E_1$) and sideband only signals ($E_2$), see FIGS. 2*a* and 2*b*. The modulating frequencies are 90 c.p.s. and 150 c.p.s. The primary modulated carrier (FIG. 2*a*) consists of a primary carrier and its four sidebands. The 150 c.p.s. sideband of the sideband only signal $E_2$ (FIG. 2*b*) is in phase with the 150 c.p.s. sidebands of the primary modulated carrier signal ($E_1$). The 90 c.p.s. sidebands, however, are out of phase as shown in FIG. 2*b*. This may be achieved by feeding the primary frequency into a mechanical modulator and cross-modulation bridge which is presently used by the FAA and described in a Department of Commerce publication entitled, "Description and Theory of Instrument Landing System," Dec. 1, 1957.

The clearance signal (FIG. 2*c*) consists of a carrier (*fc*) offset 8 kc. from the primary carrier (*fo*) and modulated by 150 c.p.s. in audio phase with the 150 cycle primary signals.

Three vertical antennas, an upper, middle and lower whose heights are 42.18 feet, 28.12 feet and 14.06 feet, respectively, are used.

Figure 3:
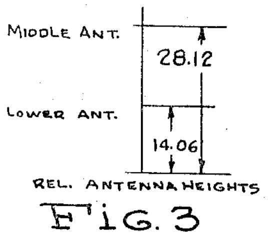
Figure 3A:
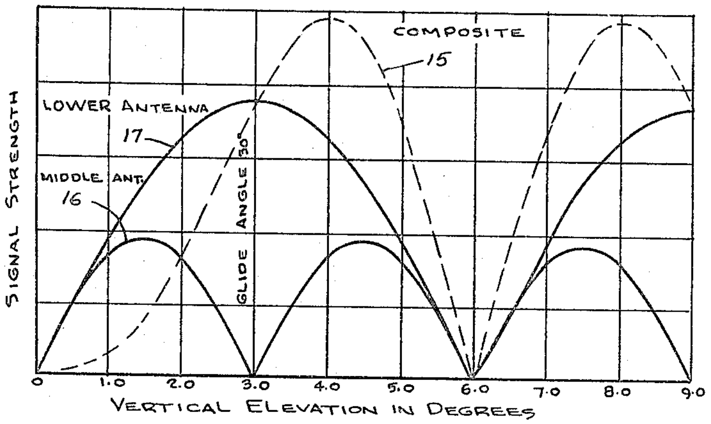

The pattern of FIG. 3*a* results by feeding the primary carrier signal $E_1$ to the middle and lower antenna shown in FIG. 3. The $E_1$ signal fed to the middle antenna is 180 degrees out of phase and with half the amplitude of the $E_1$ signal fed to the lower antenna.

The radiation from the lower antenna results in curve 17 while the middle antenna's radiation is represented by curve 16. Curve 15 is the resultant composite lobe structure.

Figure 3B:
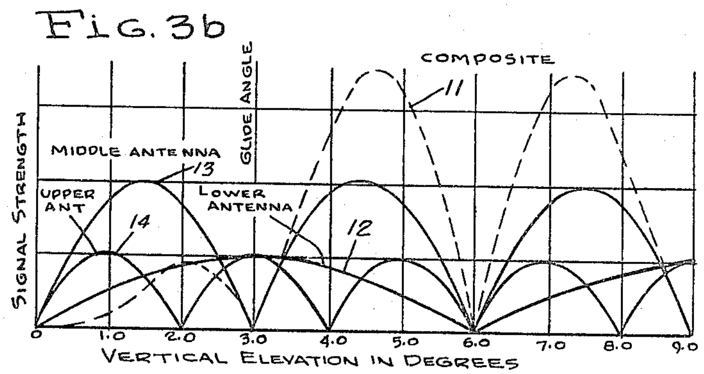
Figure 3C:
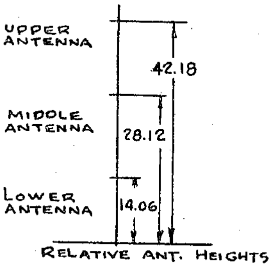
Figure 3E:
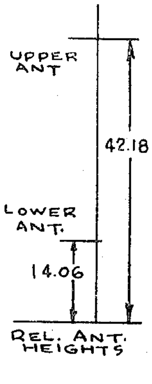

FIG. 3*b* shows the lobe structures of the sideband only ($E_2$) signal fed to the antennas of FIG. 3*c*. The upper and lower antennas are fed sideband only signals of equal amplitudes and in phase, while the middle antenna is fed 180° out of phase with and twice the amplitude of the $E_2$ signals fed to the upper and lower antennas. The radiation from the lower, middle and upper antennas produces lobes 12, 13 and 14, respectively. Lobe 11 is the resultant composite lobe. A null at 3.0 degrees defines the glide slope angle.

Figure 3D:
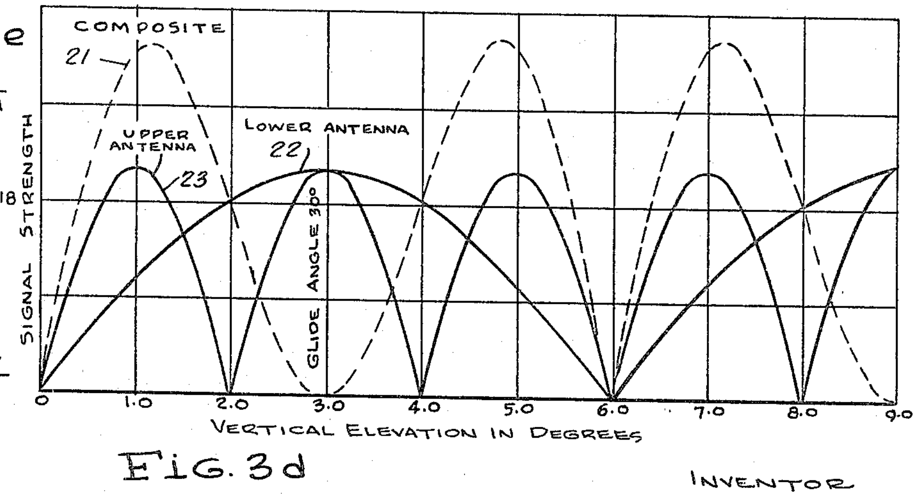

The clearance signal lobe structure FIG. 3*d*, lobe 21, results by feeding the upper and lower antennas clearance signals of equal amplitudes and in phase. The radiation from the lower and upper antennas produces curves 22 and 23 respectively. Curve 21 is the resultant composite lobe.

Figure 4:
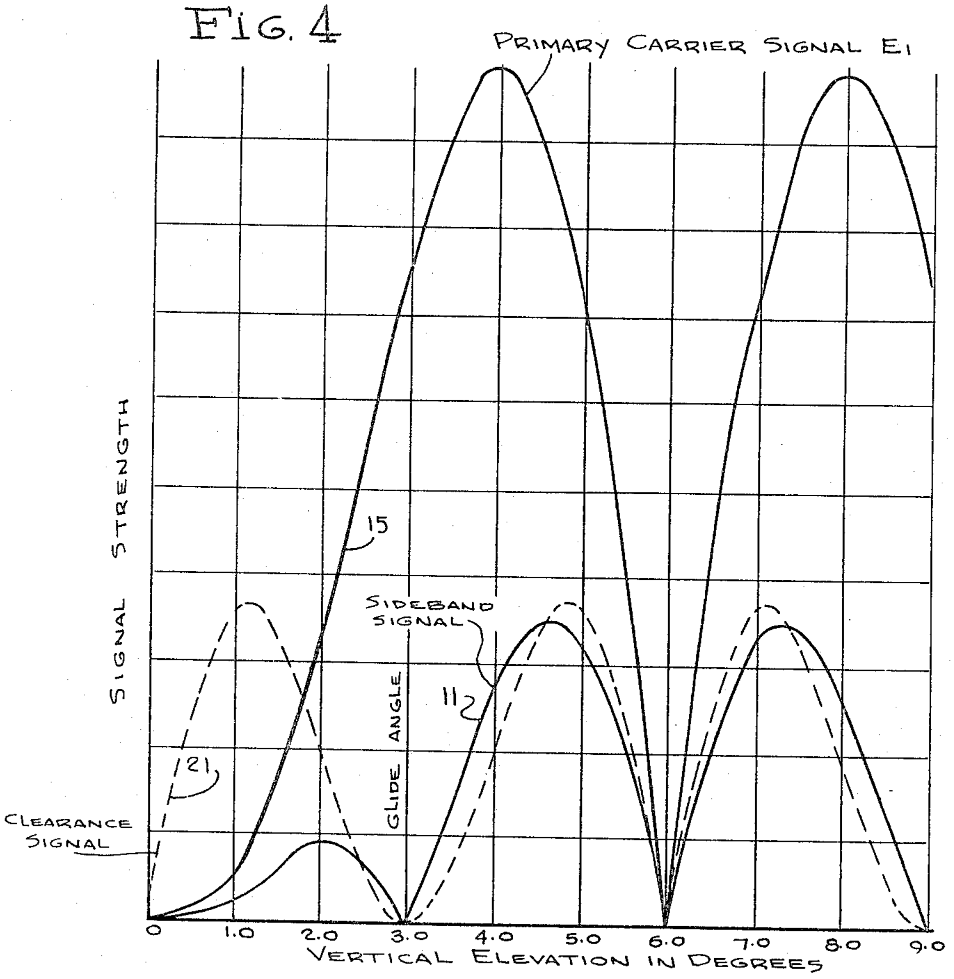
FIG. 4 is the composite vertical lobe structure.

FIG. 4 combines the three composite lobes resulting from the primary carrier signal $E_1$ (curve 15), the sideband only signal $E_2$ (curve 11), and the clearance signal (curve 21). An airborne receiver would "see" the pattern of FIG. 4. Without the presence of the clearance signal lobe curve 21, FIG. 4, an airplane flying below the glide in the zero to two degree region would be in grave danger because this area would be wanting in a field of sufficient strength to provide accurate guidance (see FIG. 4). But the addition of the clearance signal creates safer flying conditions. Also any reflections of the clearance signal into the 3 degree on-course region has little effect on the fllyability because the primary signal is the much stronger signal and would overwhelm any reflected signals.

Figure 5:
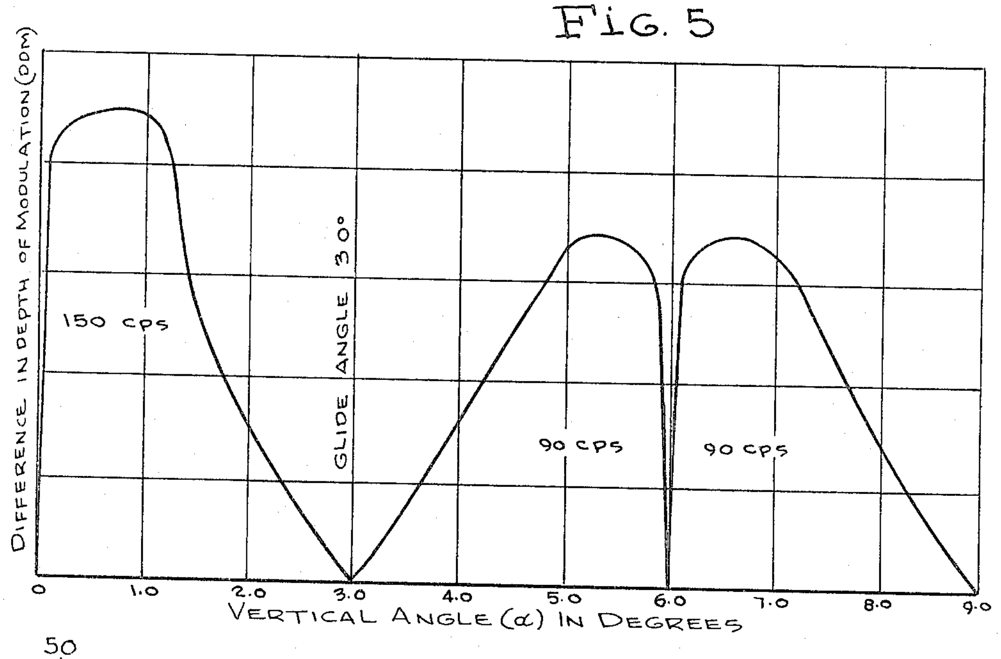
FIG. 5 is a graph of the difference in depth of modulation (ddm) as a function of the elevation angle.

FIG. 5 shows the ddm characteristics of the combined signals in space. Excellent linearity is produced in the area from 2.0 to 3.0 degrees and high ddm values are obtained at angles below 2.0 degrees.

Figure 2C:
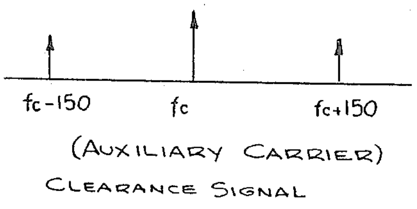

The equipment required to effectuate the feeding arrangement described herein is shown in FIG. 6*a*. The R.F. input is fed into the cross-modulation bridge and mechanical modulator unit 50 the output of which is the primary modulated carrier and its sidebands $E_1$, and sideband only signals $E_2$ of FIGS. 2*a* and 2*b*. Signals $E_2$ proceed into an amplitude control unit 51 then on to a bridge 52. Phase control is accomplished by phaser 53. The signal $E_2$ is then fed into a sideband power divider which consists of an adjustable T 54 feeding a bridge 55. A portion of the sideband signals $E_2$ proceeds to combining bridge 56 and a portion to combining bridge 57. The auxiliary signal of FIG. 2*c* is introduced into this arrangement through leg 75 of combining bridge 56. Simultaneously the primary carrier signals $E_1$ from the output of the cross-modulation bridge and mechanical modulator unit is introduced into a power divider which consists of an adjustable T 58 feeding a bridge 62. Part of the $E_2$ signal then proceeds to combining bridge 57 and part to combining bridge 59. Phase adjuster 60 in connected between combining bridge 59 and bridge 63. Bridges 63, 57 and 59 feed the upper, middle and lower antennas, respectively. Phase adjusters 64 and 65 are located in the upper and lower antenna feed lines. Finally, throughline bodies 66, 67 and 68 which essentially consist of R.F. bodies are placed directly before the antenna inputs.

The operation of FIG. 6*b* is much the same as that of FIG. 6*a*. The variation occurs by the elimination of bridge circuit 56 and the depicted means for introducing the 150 cycle clearance signal into the radiation circuitry. In FIG. 6*b*, the introduction of the clearance signal into the radiation pattern, as depicted in FIG. 1*b*, is by a separate antenna 76' fed by transmitter 75' and power output control 77'.

I claim:

1. A landing system for producing a vertical lobe pattern to define a glide path comprising:

(a) a lower antenna;

(b) a middle antenna disposed above the lower antenna;

(c) an upper antenna disposed above the middle antenna;

(d) a source of sideband energy modulated by 90 c.p.s. and 150 c.p.s. signals;

(e) a source of primary carrier energy modulated by 90 c.p.s. and 150 c.p.s. signals;

(f) a source of clearance carrier energy at a different frequency from that of said primary carrier energy and modulated to encompass sideband signals;

(g) means for feeding said sideband energy in phase into the upper and lower antennas, and feeding said sideband energy into the middle antenna out of phase with the sideband energy feed to said upper and lower antennas;

(h) means for feeding the primary carrier energy into the middle and lower antennas out of phase with each other; and (i) means for feeding the clearance signal into the upper and lower antennas in phase.

2. The system as recited in claim 1 further comprising: means for controlling the amplitude of said sideband energy.

3. The system as set forth in claim 1 in which the relative antenna heights are in the ratio of 1, 2 and 3.0 relative to the lowest antenna.

4. A landing system for producing a vertical lobe pattern to define a glide path comprising:

(a) a lower antenna;

(b) a middle antenna disposed above the lower antenna;

(c) an upper antenna disposed above the middle antenna;

(d) a clearance antenna disposed generally laterally to the middle antenna;

(e) a source of primary carrier energy modulated to encompass sideband signals;

(f) a source of sideband energy;

(g) a source of clearance carrier energy at a different frequency from that of said primary carrier energy and modulated to encompass sideband signals;

(h) means for feeding the sideband energy in phase to the upper and lower antennas;

(i) means for feeding the sideband energy to the middle antenna out of phase with said energy fed to the upper and lower antennas;

(j) means for feeding the primary carrier energy to the middle and lower antennas out of phase with each other; and (k) means for feeding the clearance energy to said clearance antenna to provide additional low angle clearance for said vertical lobe pattern.

5. The system as set forth in claim 1 wherein the clearance signal is offset approximately 5 to 20 kilocycles from the primary carrier.

6. The system as set forth in claim 4 wherein the heights of the lower, middle and upper antennas are 1, 3.01 and 4.21 units respectively.

7. The system as set forth in claim 4 wherein the clearance antenna is at substantially the same height as the middle antenna.

8. The system as set forth in claim 4 wherein the amplitude of the primary carrier energy fed to the lower antenna is one unit, the amplitude of the primary carrier energy fed to the middle antenna is ⅓ unit, the amplitudes to the sideband energy fed to the upper, middle and lower antennas are .183, .315 and .192 units of the primary carrier energy fed to the lower antenna.

9. The system as described in claim 8 wherein the sideband and primary carrier are both modulated with frequencies of 90 and 150 c.p.s.

10. The system as described in claim 9 wherein the clearance signal is modulated by 150 c.p.s.

References Cited

UNITED STATES PATENTS

| | | | |
|---|---|---|---|
| 2,379,442 | 7/1945 | Kandoian | 343—108 |
| 2,406,876 | 9/1946 | Watts | 343—108 |
| 2,610,321 | 9/1952 | Watts | 343—108 |
| 2,771,603 | 11/1956 | Pickles et al. | 343—108 |
| 3,283,326 | 11/1966 | Watts | 343—107 |
| 3,305,886 | 2/1967 | Earp | 343—109 |

OTHER REFERENCES

Iden, F. W.: "Glide-Slope Arrays for Use Under Adverse Siting Conditions," IRE Transactions on Aeronautical and Navigational Electronics, vol. ANE–6, No. 2 (June 1959), pp. 100–112.

RODNEY D. BENNETT, *Primary Examiner.*

CHESTER L. JUSTUS, *Examiner.*

H. C. WAMSLEY, *Assistant Examiner.*